(12) United States Patent
Widger et al.

(10) Patent No.: US 10,322,367 B2
(45) Date of Patent: Jun. 18, 2019

(54) METHOD OF DEVELOPMENT AND USE OF CATALYST-FUNCTIONALIZED CATALYTIC PARTICLES TO INCREASE THE MASS TRANSFER RATE OF SOLVENTS USED IN ACID GAS CLEANUP

(71) Applicant: University of Kentucky Research Foundation, Lexington, KY (US)

(72) Inventors: Leland R. Widger, Lexington, KY (US); Cameron A. Lippert, Lexington, KY (US); Kunlei Liu, Lexington, KY (US)

(73) Assignee: UNIVERSITY OF KENTUCKY RESEARCH FOUNDATION, Lexington, KY (US)

(*) Notice: Subject to any disclaimer, the term of this patent is extended or adjusted under 35 U.S.C. 154(b) by 0 days.

(21) Appl. No.: 15/429,523

(22) Filed: Feb. 10, 2017

(65) Prior Publication Data

US 2017/0232380 A1    Aug. 17, 2017

Related U.S. Application Data

(60) Provisional application No. 62/294,663, filed on Feb. 12, 2016.

(51) Int. Cl.
*C07F 19/00* (2006.01)
*C07F 3/06* (2006.01)
(Continued)

(52) U.S. Cl.
CPC ..... *B01D 53/1493* (2013.01); *B01D 53/1475* (2013.01); *B01D 53/8671* (2013.01); *B01J 21/06* (2013.01); *B01J 31/2217* (2013.01); *B01J 35/00* (2013.01); *B01J 35/026* (2013.01); *B01J 37/0221* (2013.01); *B01D 2252/2041* (2013.01);
(Continued)

(58) Field of Classification Search
None
See application file for complete search history.

(56) References Cited

U.S. PATENT DOCUMENTS 6,974,878 B2    12/2005  Guram et al.
7,244,805 B2    7/2007   Park et al.
(Continued)

FOREIGN PATENT DOCUMENTS

CN    103566735 A     2/2014
DE    102012020141 A1  4/2014
(Continued)

OTHER PUBLICATIONS

Chingombe et al., "Surface modification and characterization of a coal-based activated carbon." Carbon, vol. 43 (2005), pp. 3132-3143.*

(Continued)

*Primary Examiner* — Daniel Berns
(74) *Attorney, Agent, or Firm* — King & Schickli, PLLC

(57) ABSTRACT

The present invention relates to methods for improving carbon capture using entrained catalytic-particles within an amine solvent. The particles are functionalized and appended with a $CO_2$ hydration catalyst to enhance the kinetics of $CO_2$ hydration and improve overall mass transfer of $CO_2$ from an acid gas.

20 Claims, 10 Drawing Sheets

(51) Int. Cl.

| | | |
|---|---|---|
| C07F 3/08 | (2006.01) | |
| C07F 3/10 | (2006.01) | |
| C07F 1/08 | (2006.01) | |
| C07F 1/10 | (2006.01) | |
| C07F 1/12 | (2006.01) | |
| C07F 9/00 | (2006.01) | |
| C07F 11/00 | (2006.01) | |
| C07F 13/00 | (2006.01) | |
| C07F 15/00 | (2006.01) | |
| C07F 15/02 | (2006.01) | |
| C07F 15/04 | (2006.01) | |
| C07F 15/06 | (2006.01) | |
| B01D 53/14 | (2006.01) | |
| B01J 31/22 | (2006.01) | |
| B01J 21/06 | (2006.01) | |
| B01J 35/00 | (2006.01) | |
| B01J 35/02 | (2006.01) | |
| B01J 37/02 | (2006.01) | |
| B01D 53/86 | (2006.01) | |

(52) U.S. Cl.
CPC ......... B01D 2252/20405 (2013.01); B01D 2252/20415 (2013.01); B01D 2252/20421 (2013.01); B01D 2252/20431 (2013.01); B01D 2252/20442 (2013.01); B01D 2252/20447 (2013.01); B01D 2252/20452 (2013.01); B01D 2252/20484 (2013.01); B01D 2252/20489 (2013.01); B01D 2252/20494 (2013.01); B01D 2252/602 (2013.01); B01D 2253/102 (2013.01); B01D 2253/106 (2013.01); B01D 2255/20746 (2013.01); B01D 2255/20792 (2013.01); B01D 2255/30 (2013.01); B01D 2255/9202 (2013.01); B01D 2256/24 (2013.01); B01D 2257/504 (2013.01); B01D 2258/0283 (2013.01); B01J 2231/005 (2013.01); B01J 2531/26 (2013.01); B01J 2531/845 (2013.01); Y02C 10/06 (2013.01)

(56) References Cited

U.S. PATENT DOCUMENTS

| | | |
|---|---|---|
| 7,619,093 B2 | 11/2009 | Meiere |
| 8,394,351 B2 | 3/2013 | Valdez et al. |
| 8,480,792 B2 | 7/2013 | Yaghi et al. |
| 8,703,082 B2 | 4/2014 | Svendsen et al. |
| 8,715,392 B2 | 5/2014 | Liu |
| 8,962,511 B2 | 2/2015 | Lightstone et al. |
| 2010/0226841 A1* | 9/2010 | Thiele ............ B01D 53/1475 423/234 |
| 2012/0064610 A1 | 3/2012 | Vitse et al. |
| 2012/0216680 A1 | 8/2012 | Vimalchand et al. |
| 2013/0059987 A1 | 3/2013 | Quantrille et al. |
| 2013/0108532 A1 | 5/2013 | Idem et al. |
| 2013/0244305 A1 | 9/2013 | Versteeg et al. |
| 2013/0259785 A1 | 10/2013 | Vitse et al. |
| 2013/0260442 A1 | 10/2013 | Vitse |
| 2014/0194627 A1 | 7/2014 | Brandstadt et al. |
| 2015/0104367 A1 | 4/2015 | Floyd et al. |

FOREIGN PATENT DOCUMENTS

| | | |
|---|---|---|
| EP | 2551007 A1 | 1/2013 |
| JP | 2012020221 A | 2/2012 |

OTHER PUBLICATIONS

Teng et al., "Viscosity of Aqueous Solutions of N-Methyldiethanolamine and of Diethanolamine." J. Chem. Eng. Data (1994), vol. 39, pp. 290-293.*
CN103566735—English machine translation.
EP2551007—English machine translation.
JP2012020221—English machine translation.
DE102012020141—English machine translation.

* cited by examiner

METHOD OF DEVELOPMENT AND USE OF CATALYST-FUNCTIONALIZED CATALYTIC PARTICLES TO INCREASE THE MASS TRANSFER RATE OF SOLVENTS USED IN ACID GAS CLEANUP

RELATED APPLICATIONS

This application claims priority to U.S. Provisional Patent Application 62/294,663, filed Feb. 12, 2016, which is hereby incorporated by reference it its entirety.

TECHNICAL FIELD

The present invention relates generally to methods for carbon capture using entrained catalytic-particles in liquid solvents.

BACKGROUND

The cleanup of acid gasses, such as $CO_2$, from natural gas has been an extensively practiced technology. The industrial removal of $CO_2$ from natural gas dates back to the 1930's. While several technologies exist for the removal of acid gasses, one of the most commonly employed practices is the use of aqueous amines. In this process the amine reacts with the $CO_2$ to form a carbamate or bicarbonate salt along with a protonated amine to balance the overall charge. The overall process for a thermal swing absorption process is depicted in FIG. 1. Here, the liquid, $CO_2$ rich amine from the bottom of the absorber, is then passed through a heat exchanger to improve efficiency before being heated to a higher temperature in the stripper. The stripper removes the $CO_2$ as a gas from the amine solution to produce a lean, or $CO_2$ deficient solution. The lean solution is returned to the absorber by way of the heat exchanger to repeat the process.

The application of $CO_2$ capture to post-combustion flue gas separation has recently been an area of major concern. On the long term, it is thought that this technology will be critical to reducing emissions from fossil fuel combustion potentially responsible for climate change. Thus, the market for carbon capture technologies could be enormous with over 1.5 billion tons of $CO_2$ produced annually from coal combustion in the US alone. In the shorter term Enhanced Oil Recovery (EOR) and utilization in downstream products (polymers or chemicals) represents a significant opportunity for marketing technical solutions. The total market for post-combustion $CO_2$ capture technologies (>$6B over the next 20 y) represents massive potential value for intellectual property development sales such as from technology development or licensing fees.

With continued societal and regulatory concern over the global climate change, the market has been driving the post-combustion capture technology development towards commercial scale. However, the technology is still in principle inefficient and energy intensive. One challenge is that the flue gas from fossil fuel boilers is at near atmospheric pressure and the concentration of $CO_2$ is relatively low at 12-14%, thus, huge gas flow rate and large scale of absorber would cause high capital cost. Another technical hurdle is the energy penalty associated with the $CO_2$ capture and solvent regeneration which could generally reduce a pulverized coal plant's output by around 30%, which equates to a very significant 60-80% increase in the electricity cost.

SUMMARY OF THE INVENTION

The present invention provides a biphasic scrubbing solution comprising an amine solvent with particles suspended therein, the particles having a surface-appended carbonic anhydrase mimic catalyst. In some embodiments, the particles have a width of less than about 500 microns. In other embodiments, the particles are hydrophobic. In further embodiments, the particles are activated carbon or silicon.

In some embodiments, the particles are functionalized to increase positive zeta potential, such as by oxidation. Particles may also be functionalized by appending with a functional group selected from the group consisting of an alcohol, a primary amine, a tertiary amine, and an amino silane. In instances where the particle is silicon, functionalization may be achieved by ball milling in the presence of an alkene.

The surface-appended carbonic anhydrase mimic catalyst may comprises a bidentate transition-metal ligand complex, such as the structure:

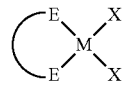

where:

(a) M is any group VII B through XII B element;

(b) x=neutral sigma donor or monovalent anion; and (c)

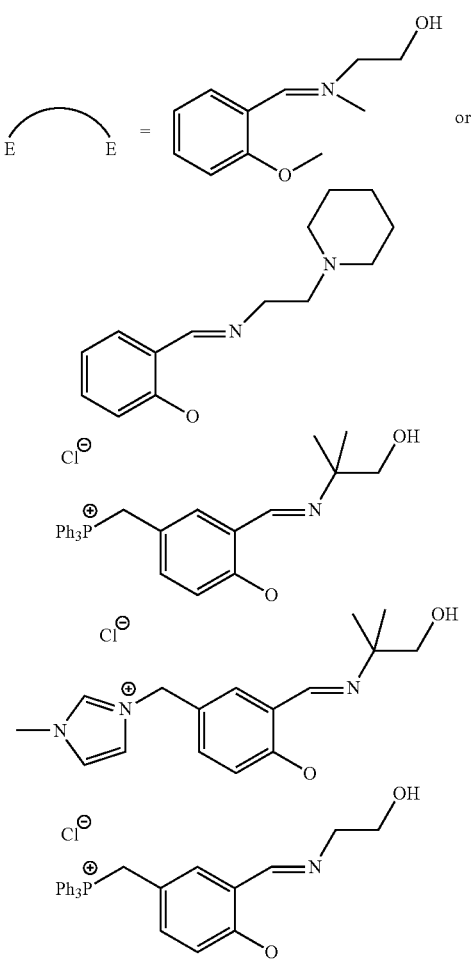

-continued

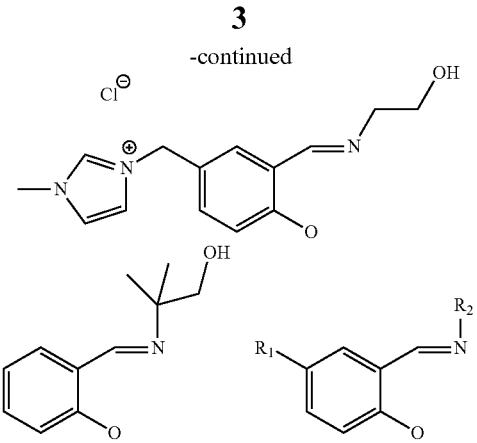

$R_1$=H, any alkyl, RCOOH (R=alkyl ranging from 0-10 carbons); OligoPEG, phosphate, ROH (R=alkyl ranging from 0-5 carbons), —[OCH$_2$CH$_2$] repeats; OH; SO$_3$; NO$_2$; amine, amide, carbonyl Cl, Br, I, F, BH$_3$, [CH$_2$Q]+[A]-; and

where A=monovalent anion: Cl, Br, I, F, PF$_6$, BF$_4$, acetate, trifluoroacetate, ClO$_4$, NO$_3$, and Q=monovalent cation: P(R)$_3$, R=alkyl, cyclic alkyl, Aryl, O-alkyl, O-Aryl; and N(R)$_3$, R=alkyl, cyclic alkyl, N-heterocyclic ring, imidazole; and $R_2$=CE; where C=any alkyl, cyclic alkyl, aryl, and E=OH, NH$_2$, N(R)$_3$, R=alkyl, cyclic alkyl, N-heterocyclic ring, imidazole, morpholine.

The bidentate transition-metal ligand complex may also comprise a structure selected from:

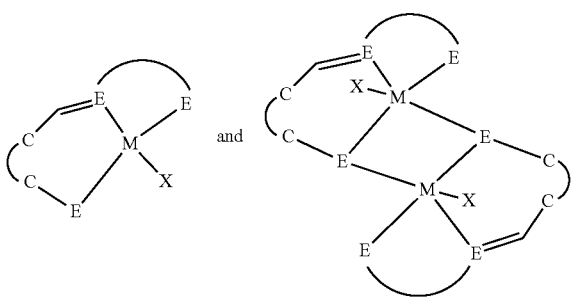

where:
(a) M is any group VII B through XII B element;
(b) x=neutral sigma donor or monovalent anion;
(c)

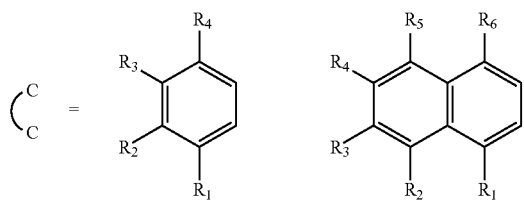

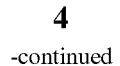

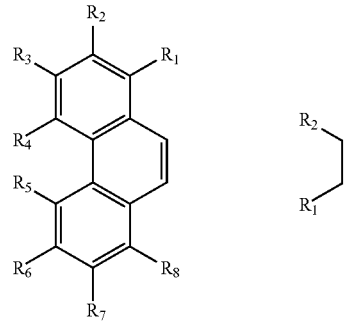

where $R_1$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl, Cl, Br, I, F, BH$_3$, [CH$_2$Q]$^+$ [A]$^-$ $R_2$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_3$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_4$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_5$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_6$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_7$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_8$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$ [A]$^-$; and

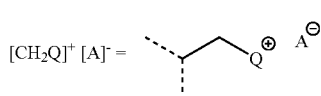

where A=monovalent anion: Cl, Br, I, F, PF$_6$, BF$_4$, acetate, trifluoroacetate, ClO$_4$, NO$_3$, and Q=monovalent cation: P(R)$_3$, R=alkyl, cyclic alkyl, Aryl, O-alkyl, O-Aryl;

N(R)$_3$, R=alkyl, cyclic alkyl, N-heterocyclic ring, imidazole; and (d)

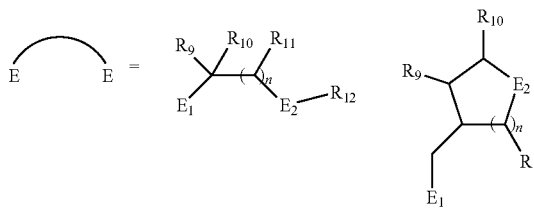

where
$E_1$ = N, P, S, B;
$E_2$ = N, P, S, O, B; and
n = 1-10.

In other embodiments, the bidentate transition-metal ligand complex is selected from one of the following structures:

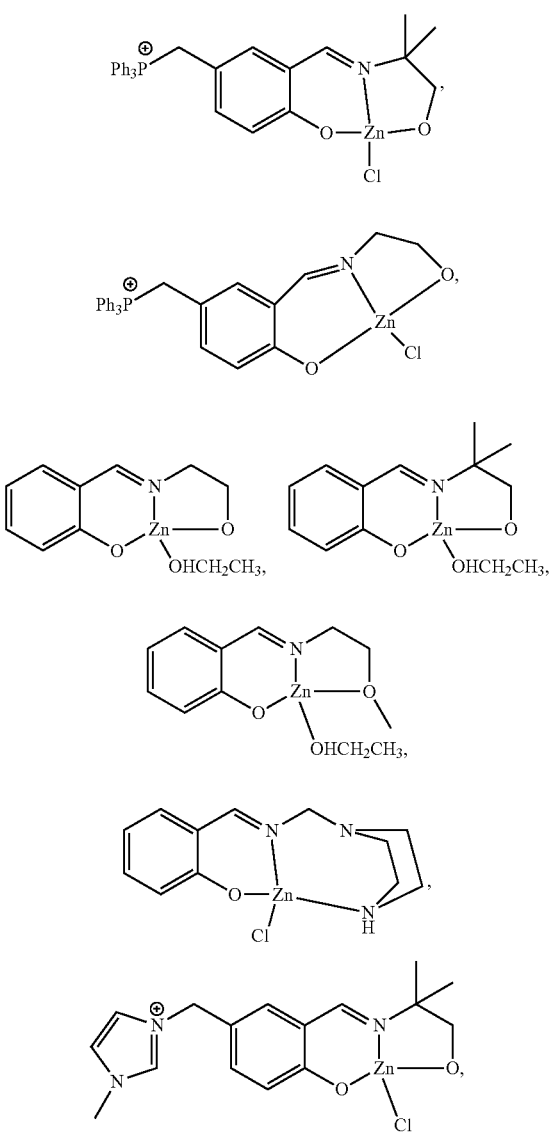

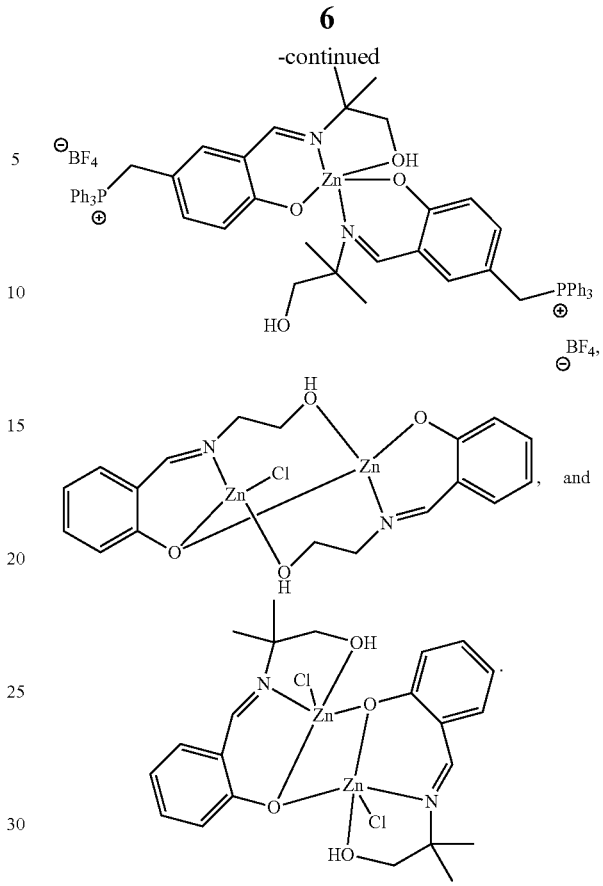

In some embodiments, the particles have a width of between about 0.1 and 500 microns. In other embodiments, the particles have a width of less than 100 nanometers. In further embodiments, combinations of the two may be used.

The amine solvent may comprise an carbon capture solvent, such as monoethanolamine (MEA), 1-amino-2-propanol (1A2P), 3-amino-1-propanol, 2-amino-1-propanol, 2-amino-1-butanol, 1-amino-2-butanol, 3-amino-2-butanol, 2-(methylamino)ethanol (MAE), 2-(ethylamino)ethanol, morpholine, piperazine (PZ), 1-methylpiperazine (NMP), 2-methylpiperazine, hydroxypiperidine, 2-piperidineethanol, N-aminoethylpiperazine (AEP), aminopropylmorpholine, 4-aminopiperidine, 2-amino-2-methyl-1-propanol (AMP), diethanolamine (DEA), diisopropanolamine (DIPA), glycine, alanine, β-alanine, sarcosine, ethylene diamine (EDA), 1,3-propanediamine, 1,4-butanediamine, 1,5-pentanediamine, 1,6-hexanediamine, methyldiethanolamine (MDEA), triethanolamine (TEA), dimethylethanolamine (DMEA), N,N,N',N'-tetramethyl-1,8-naphthalenediamine, diethylmonoethanolamine, dipropylmonoethanolamine, 1,4-dimethylpiperazine, N N,N',N'-tetramethyl-1,6-hexanediamine, N,N,N',N'-tetrakis (2-hydroxyethyl)ethylenediamine, N,N,N',N',N''-pentamethyldiethylenetriamine, N,N,N',N'-tetramethylethylenediamine, N,N,N',N'-tetramethylpropane-1,3-diamine, N,N,N', N'-tetramethylbutane-1,4-diamine, N,N,N',N'-tetramethyl-1,5-pentanediamine, alkali carbonate, and mixtures thereof.

The amine solvent comprises an amine dissolved in water, wherein the amine comprises between about 15 to about 50 weight percent of the amine solvent. The amine solvent has a viscosity of between about 3 to about 10 cP. The particles may comprise between about 0.5 to 2.5 percent by weight of the biphasic scrubbing solution.

Also provided are methods of improving carbon capture comprising utilizing the biphasic solution described herein as a stripping agent in a carbon capture system.

DETAILED DESCRIPTION

Figure 1:
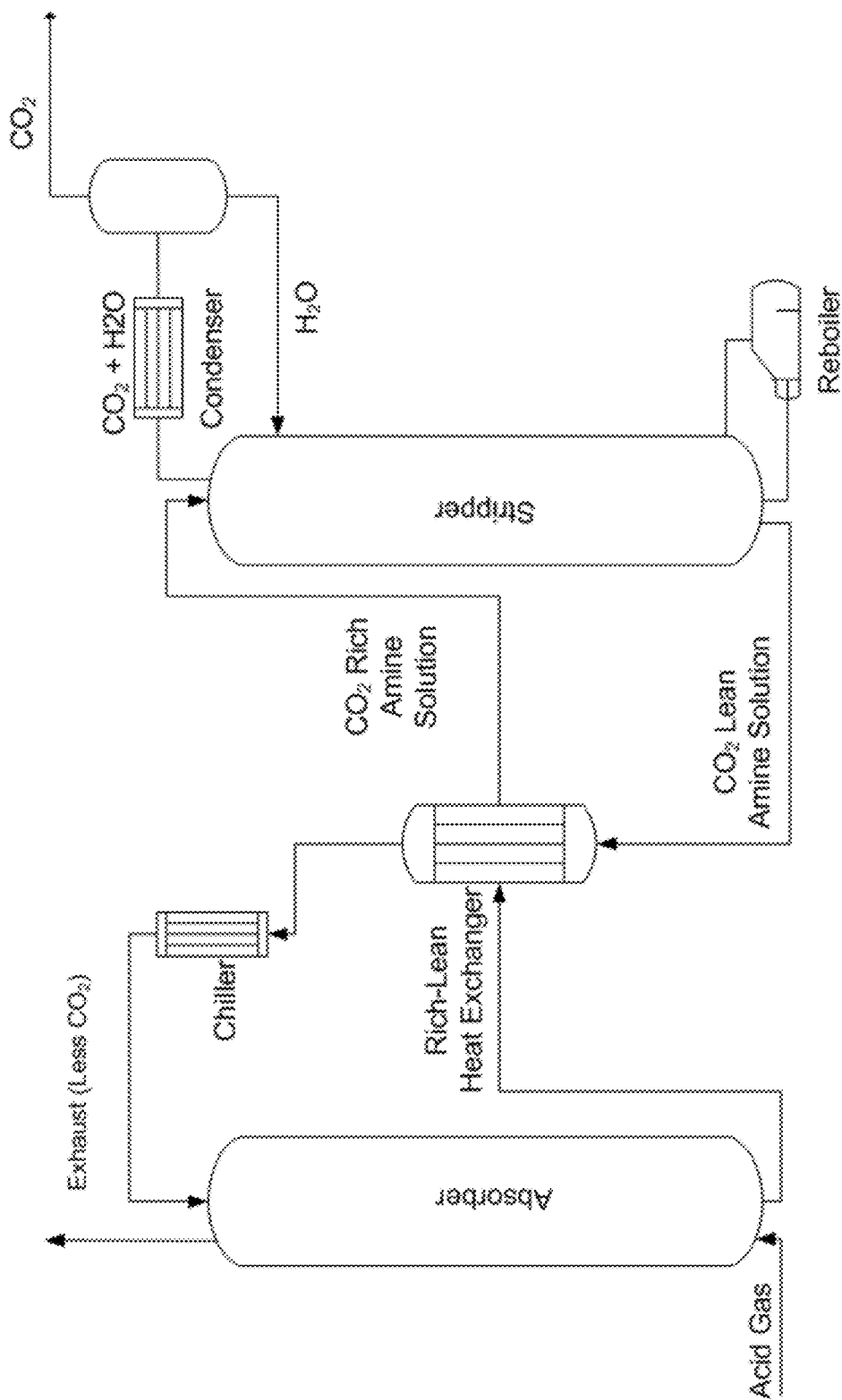
FIG. 1 shows a generalized schematic of post combustion $CO_2$ capture process using aqueous amine solvent.

The present invention provides a biphasic solution of an amine solvent with entrained catalytic particles suspended therein. The invention described herein also provides a method for more efficient removal of $CO_2$ from fossil fuel boiler flue gas using the biphasic solution as a scrubbing agent. The entrained catalytic-particle in liquid solution provides benefit to the mass transfer enhancement by enhancing liquid film macro/micro-turbulence and increasing $CO_2$ molecule and solvent active component diffusion which is usually a rate-limiting step for those fast kinetics $CO_2$ solvents. There is also an added enhancement in mass transfer due to the activity of the $CO_2$ hydration catalyst. With enhanced $CO_2$ absorption rate, the residence time to reach target capture efficient is decreased, which requires a shorter absorber length and a lower capital cost. A further benefit from this invention is that a richer carbon loading may be reached with increased mass transfer, thereby lowering stripper energy requirements. The invention can be applied to any solvent based post combustion $CO_2$ capture process in which mass transfer is limited by physical diffusion.

The small scale catalytic-catalytic-particles provides multiple features to contribute to enhanced mass transfer: (1) boundary layer turbulence enhancement. The turbulent level in liquid film is greatly enhanced by the movement of catalytic-particles which could increase the diffusion of gas molecule from the boundary layer to the bulk and fresh solvent active component from bulk to reaction interface layer. The particle size is selected to be smaller than the typical liquid layer thickness and large enough to create turbulence to enhance mass transfer; (2) "shuttle mechanism". Gas molecules are adsorbed by catalytic-particles at gas-liquid interface and travel to liquid bulk where gas molecules are released by a concentration gradient; (3) inhibition of bubble coalescence. The particle can adhere on the surface of gas bubble to inhibit the coalescence of bubble, and increase the specific gas-liquid interfacial area, and (4) Catalytic hydration of $CO_2$ into bicarbonate The system is designed so that catalytic-catalytic-particles are entrained with solvent in the absorber, providing a biphasic solution. There are options of (1) separating the catalytic-particles prior to regeneration to protect catalytic-particles from elevated temperature in stripper; and (2) keeping the catalytic-particles in solvent in regeneration process for process simplicity. In case of catalytic-particles entrained with solvent in regeneration, it is highly possible that the catalytic-particles also facilitates desorption rate as physical mass transfer is usually a limiting step at elevated temperature and fast kinetics.

Previous studies have shown increase in overall $CO_2$ mass transfer upon the addition of unfunctionalized, commercially available particles, such as activated carbon (see U.S. patent application Ser. No. 15/423,042, incorporated herein by reference in its entirety). These studies have shown that hydrophobic particles show greater enhancement, and therefore hydrophobic supports that could be functionalized with groups were targeted to serve as a covalent tether for catalysts. Two target particles were selected as exemplary support medium, carbon and silicon. The method of functionalization varies for each particle; where carbon particles are oxidized chemically to yield a carboxylic acid appended surface, and elemental silicon is ball milled in the presence of alkenes to mechanically cleave Si—Si bonds and result in strong Si—C bonds. In the case of the silicon particles, the identity and ratio of the alkene(s) used therefore determines the surface functionalization. Once a surface-functionalized particle is obtained, a transition-metal containing complex is synthesized on the solid support, which functions as a $CO_2$ hydration catalyst. This catalyst enhances the kinetics of the rate-limiting step for the $CO_2$ hydration reaction, thereby increasing overall mass transfer of $CO_2$ from the acid gas into the amine absorption solution.

Figure 2:
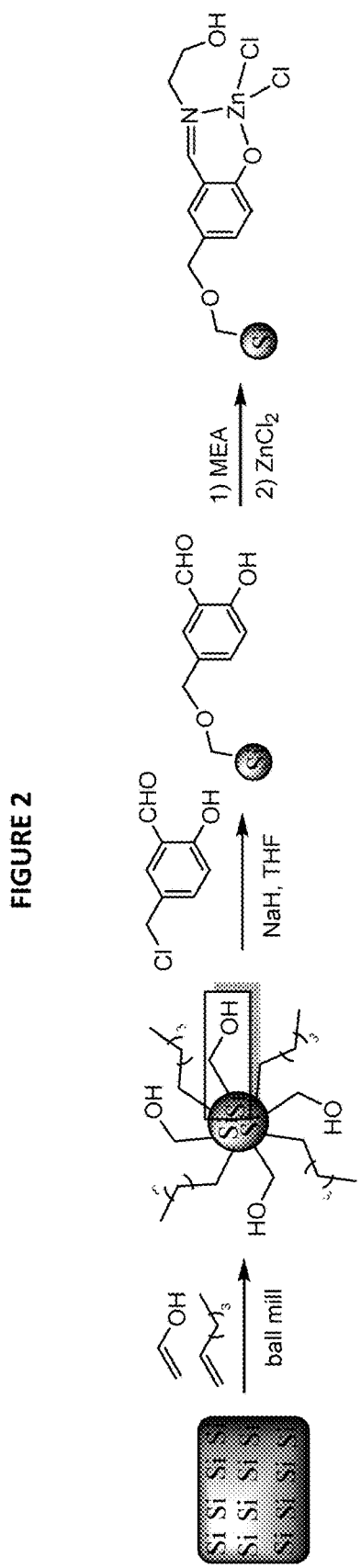
FIG. 2 shows an overview of the synthesis of catalytic Si particles.

One distinct advantage to the novel process described herein, is the overall flexibility of the synthesis, allowing for tuning of particle hydrophobicity as well as catalyst loading and catalyst structure. In the specific example shown below, we utilized silicon particles that were synthesized in the presence of a 60:40 mixture of 1-hexene and allyl alcohol. This gives a surface that is appended with a mixture of hydrophobic hexane and an alcohol for covalent tether of the catalyst (FIG. 2). Since the catalytic-particles are heterogeneous, the synthesis is easily scalable as excess reagent/solvent is easily removed by filtration or centrifugation/decantation.

Figure 3:
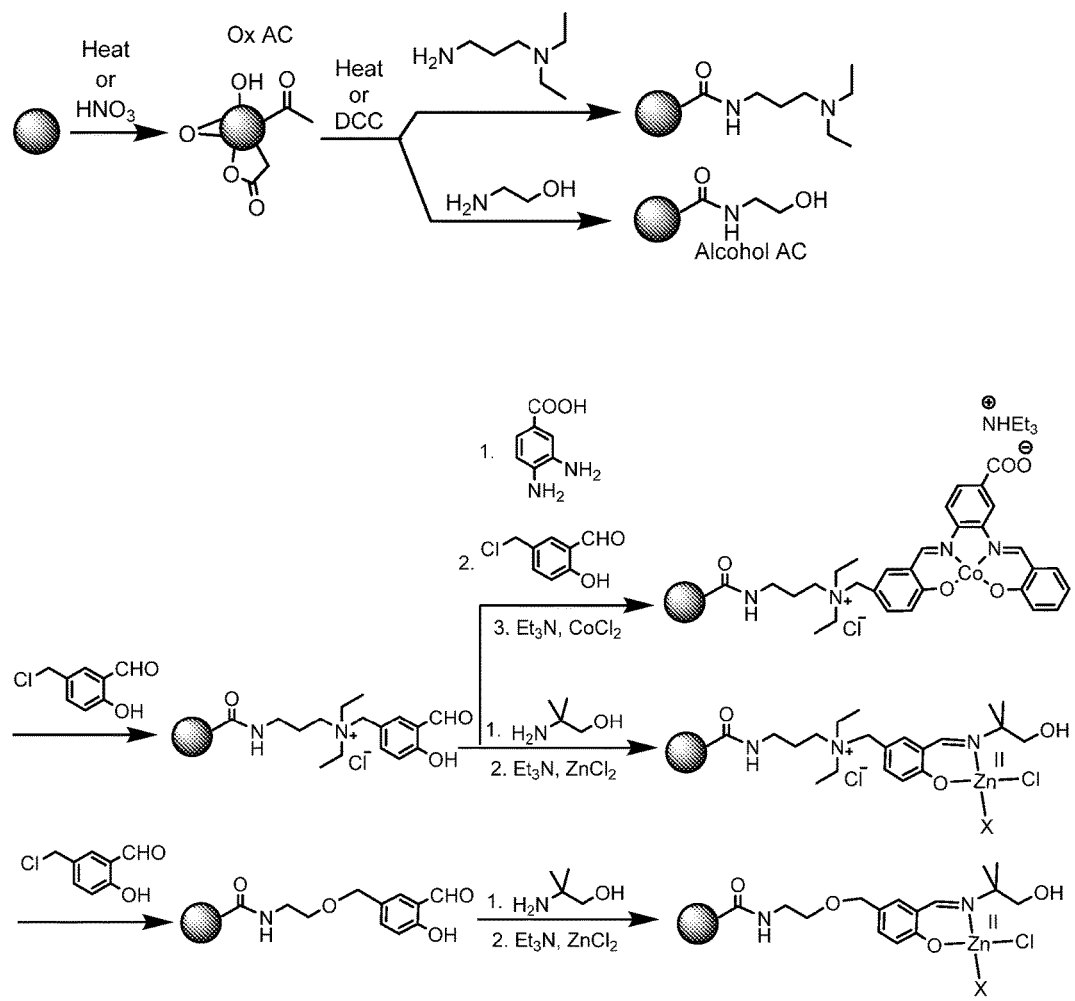
FIG. 3 shows a synthetic pathway for catalytic activated carbon particles.
Figure 4:
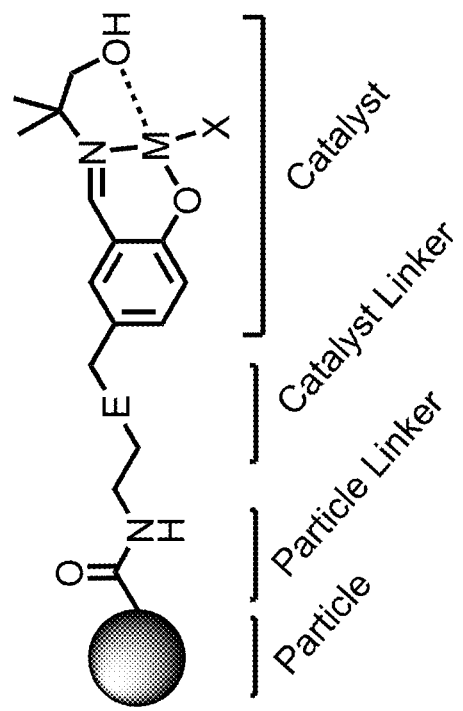
FIG. 4 shows a general design for activated carbon catalyst particles where E is an electrophile or electrophile salt, M is a transition metal, and X is a coordinating anion.

The synthesis method is readily adapted to fit alternative substrates such as activated carbon. FIG. 3 shows the fabrication process to attach various catalysts to an activated carbon core. All of the particles of this kind follow the design as shown in FIG. 4.

With regard to the particles, in certain embodiments, the particles have a width of less than about 500 microns. In further embodiments, the particles are hydrophobic. In even further embodiments, the particles are comprised of activated carbon particles and/or Si particles. A surface of the activated carbon particles may be functionalized, such as by oxidation. The activated carbon particles may also be functionalized by appending of a functional group to the particle. Examples of appended groups include an alcohol, a primary amine, a tertiary amine, and an amino silane. As mentioned above, Si particles can be functionalized through ball milling in the presence of alkenes. With regard to size, in some embodiments the particles may possess a width of between about 0.1 and 500 microns. In other embodiments, the particles have a width of less than 100 nanometers. In yet further embodiments, the particles may comprise a mixture of particles with an average width of about 0.1 to 500 micros and particles with a width of less than 100 nanometers.

With regard to the surface-appended catalyst, in some embodiments $CO_2$ hydration catalysts may be appended to the surface of particles, including carbonic anhydrase mimic catalysts. Catalysts may include catalysts containing 2-coordinate (bidentate) ligands. Such examples of suitable catalysts are identified in U.S. patent application Ser. No. 14/593,399 (incorporated by reference herein in its entirety). For example, the catalyst compound may have a chemical formula:

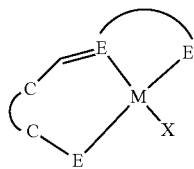

where:
(a) M is any group VII B through XII B element;
(b) x=neutral sigma donor or monovalent anion;
(c)

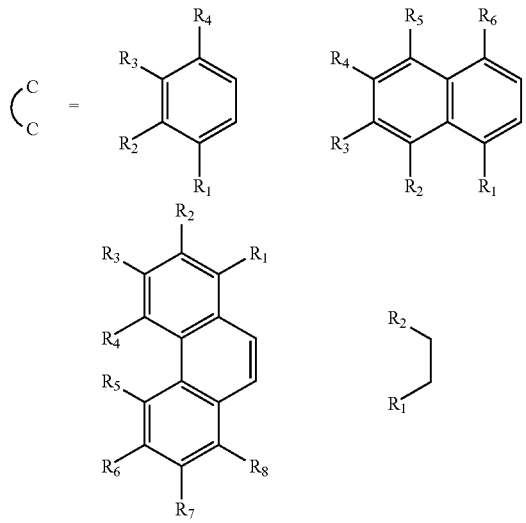

where $R_1$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl, Cl, Br, I, F, BH$_3$, [CH$_2$Q]$^+$[A]$^-$ $R_2$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_3$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_4$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_5$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_6$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_7$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_8$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$ [A]$^-$; and

where A=monovalent anion: Cl, Br, I, F, PF$_6$, BF$_4$, acetate, trifluoroacetate, ClO$_4$, NO$_3$, and Q=monovalent cation: P(R)$_3$, R=alkyl, cyclic alkyl, Aryl, O-alkyl, O-Aryl;

N(R)$_3$, R=alkyl, cyclic alkyl, N-heterocyclic ring, imidazole; and (d)

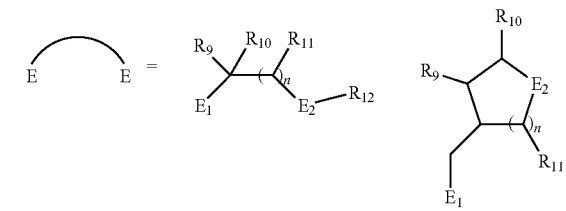

where
$E_1$=N, P, S, B;
$E_2$=N, P, S, O, B; and
n=1-10.

In further embodiments, the catalyst compound may have a chemical formula:

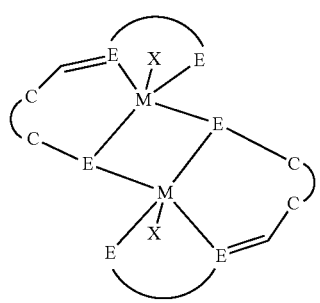

where:
(a) M is any group VII B through XII B element;
(b) x=neutral sigma donor or monovalent anion;
(c)

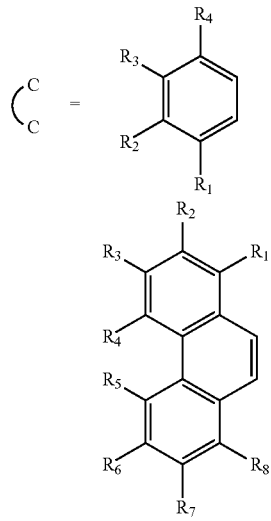

where $R_1$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl, Cl, Br, I, F, BH$_3$, [CH$_2$Q]$^+$[A]$^-$ $R_2$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_3$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_4$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_5$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_6$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_7$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_8$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$; and

where A=monovalent anion: Cl, Br, I, F, PF$_6$, BF$_4$, acetate, trifluoroacetate, ClO$_4$, NO$_3$, and Q=monovalent cation: P(R)$_3$, R=alkyl, cyclic alkyl, Aryl, O-alkyl, O-Aryl; and N(R)$_3$, R=alkyl, cyclic alkyl, N-heterocyclic ring, imidazole;

(d)

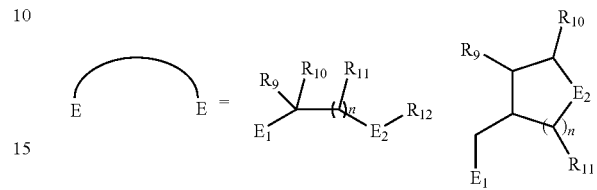

where
$E_1$=N, P, S, B;
$E_2$=N, P, S, O, B; and
n=1-10.

In further still embodiments, the catalyst compound may have a chemical formula of:

where:
(a) M is any group VII B through XII B element;
(b) x=neutral sigma donor or monovalent anion; and
(c)

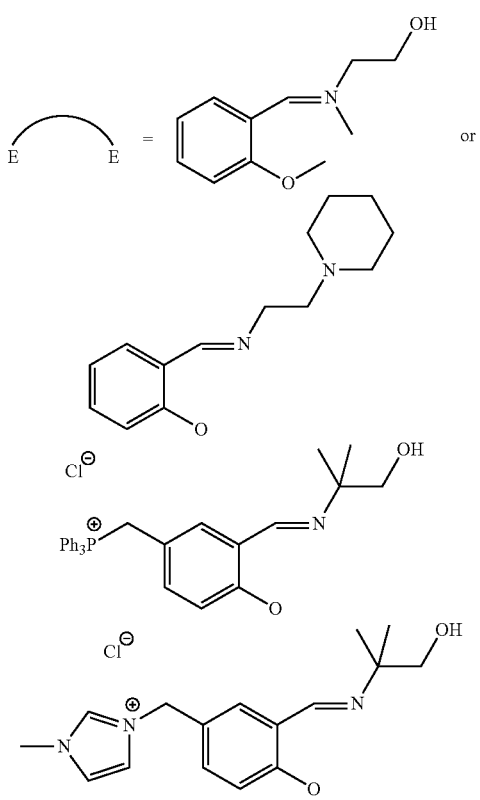

-continued

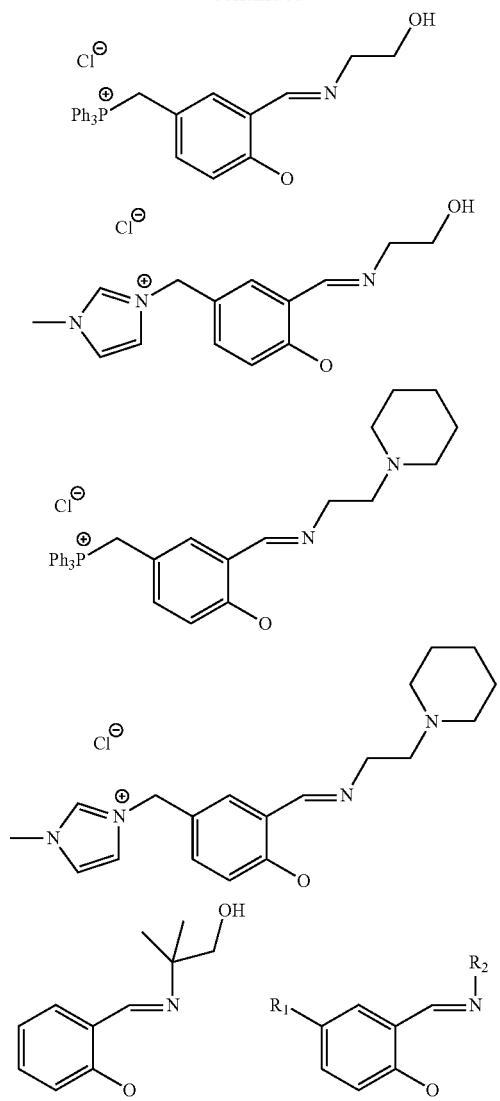

Other examples of suitable catalysts include the following structures:

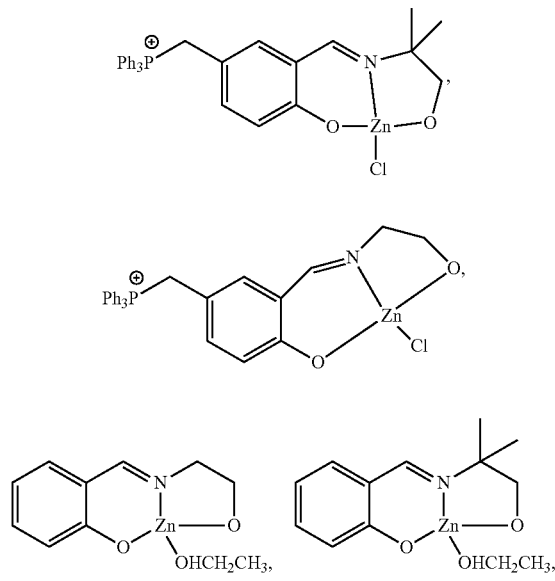

$R_1$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]+[A]-; and

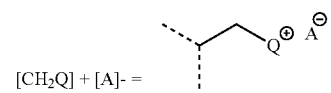

where A=monovalent anion: Cl, Br, I, F, PF$_6$, BF$_4$, acetate, trifluoroacetate, ClO$_4$, NO$_3$, and Q=monovalent cation: P(R)$_3$, R=alkyl, cyclic alkyl, Aryl, O-alkyl, O-Aryl; and N(R)$_3$, R=alkyl, cyclic alkyl, N-heterocyclic ring, imidazole; and $R_2$=CE; where C=any alkyl, cyclic alkyl, aryl, and E=OH, NH$_2$, N(R)$_3$, R=alkyl, cyclic alkyl, N-heterocyclic ring, imidazole, morpholine.

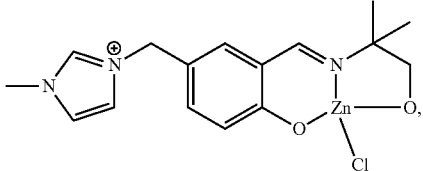

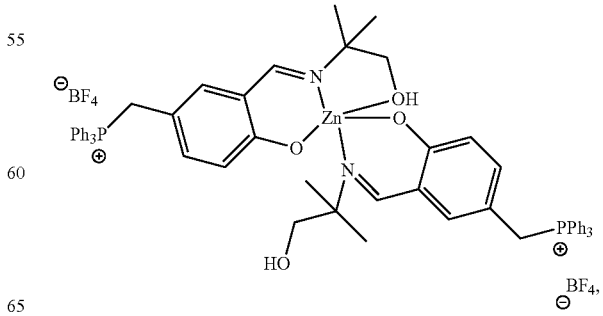

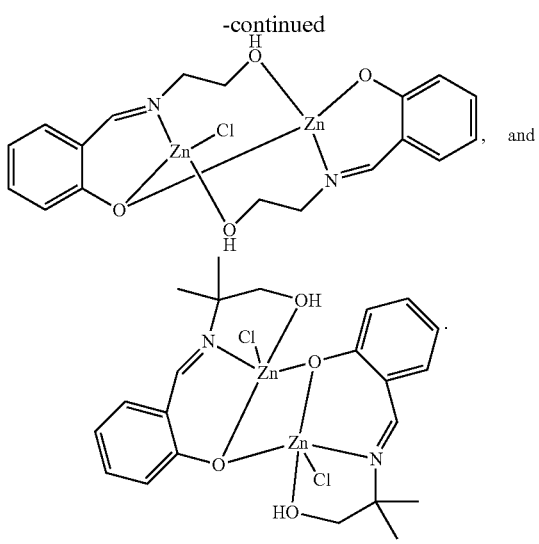

For the biphasic solution, the particles are suspended in an amine solvent. The choice of amine solvent may include amine solvents employed in carbon capture systems. For example, the amine solvent may be monoethanolamine (MEA), 1-amino-2-propanol (1A2P), 3-amino-1-propanol, 2-amino-1-propanol, 2-amino-1-butanol, 1-amino-2-butanol, 3-amino-2-butanol, 2-(methylamino)ethanol (MAE), 2-(ethylamino)ethanol, morpholine, piperazine (PZ), 1-methylpiperazine (NMP), 2-methylpiperazine, hydroxypiperidine, 2-piperidineethanol, N-aminoethylpiperazine (AEP), aminopropylmorpholine, 4-aminopiperidine, 2-amino-2-methyl-1-propanol (AMP), diethanolamine (DEA), diisopropanolamine (DTPA), glycine, alanine, β-alanine, sarcosine, ethylene diamine (EDA), 1,3-propanediamine, 1,4-butanediamine, 1,5-pentanediamine, 1,6-hexanediamine, methyldiethanolamine (MDEA), triethanolamine (TEA), dimethylethanolamine (DMEA), N,N,N',N'-tetramethyl-1,8-naphthalenediamine, diethylmonoethanolamine, dipropylmonoethanolamine, 1,4-dimethylpiperazine, N N,N',N'-tetramethyl-1,6-hexanediamine, N,N,N',N'-tetrakis(2-hydroxyethyl)ethylenediamine, N,N,N',N',N"-pentamethyldiethylenetriamine, N,N,N',N'-tetramethylethylenediamine, N,N,N',N'-tetramethylpropane-1,3-diamine, N,N,N',N'-tetramethylbutane-1,4-diamine, N,N,N',N'-tetramethyl-1,5-pentanediamine, alkali carbonate, and mixtures thereof.

Within the amine solvent, the particles may comprise between about 0.5 to 3 percent by weight of the biphasic scrubbing solution. The corresponding amine may be dissolved in water to achieve about 15 to about 50 weight percent of the amine solvent. The amine solvent has a viscosity of between about 3 to about 10 cP.

In certain embodiments, the biphasic solution counterflows against the gas flow. The contacting between the biphasic solution and the gas allows a liquid film forms at the interface of the gas flow and the biphasic solution. The presence of the particles increases amine and carbamate salt diffusion from the liquid film.

Further embodiments also include a carbon capture system comprised of a stripper, the stripper containing the described biphasic solution of amine solvents with particles appended with catalysts suspended therein.

EXAMPLES

Example 1

Figure 5:
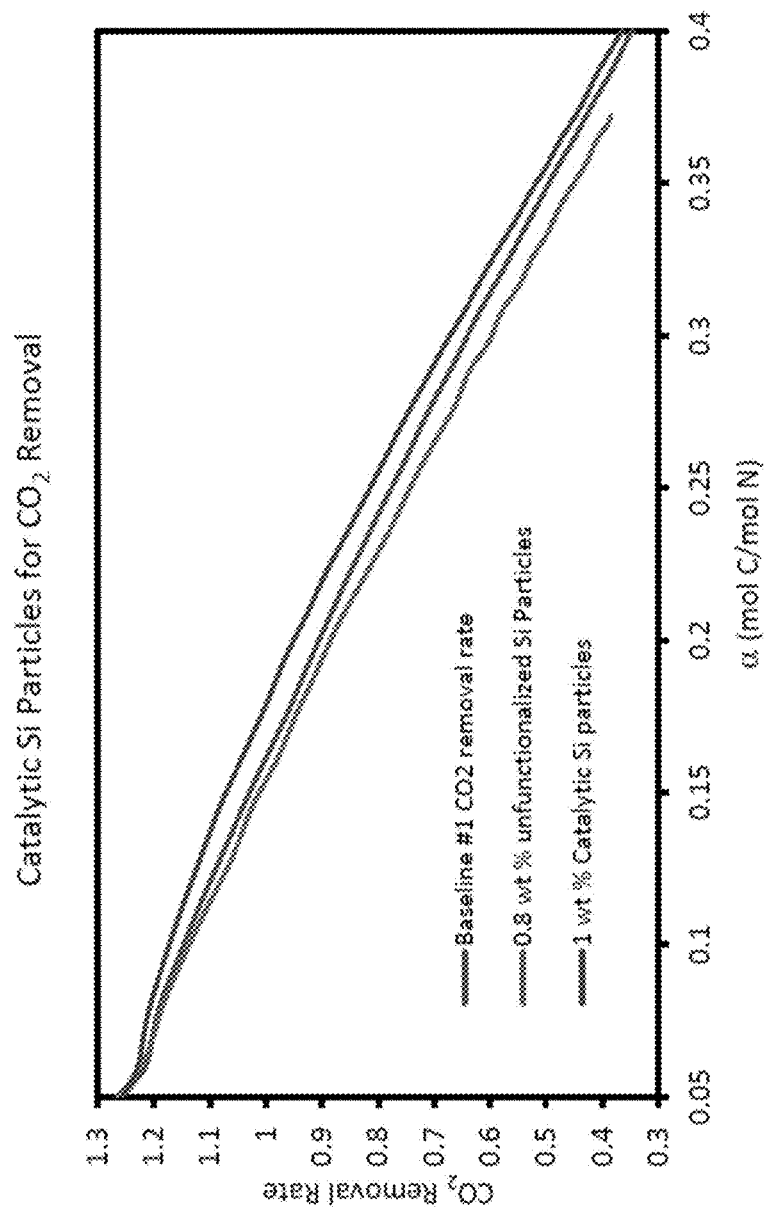
FIG. 5 shows a comparison of $CO_2$ absorption rate between baseline 30% MEA, Si particles, and catalytic-particles.
Figure 6:
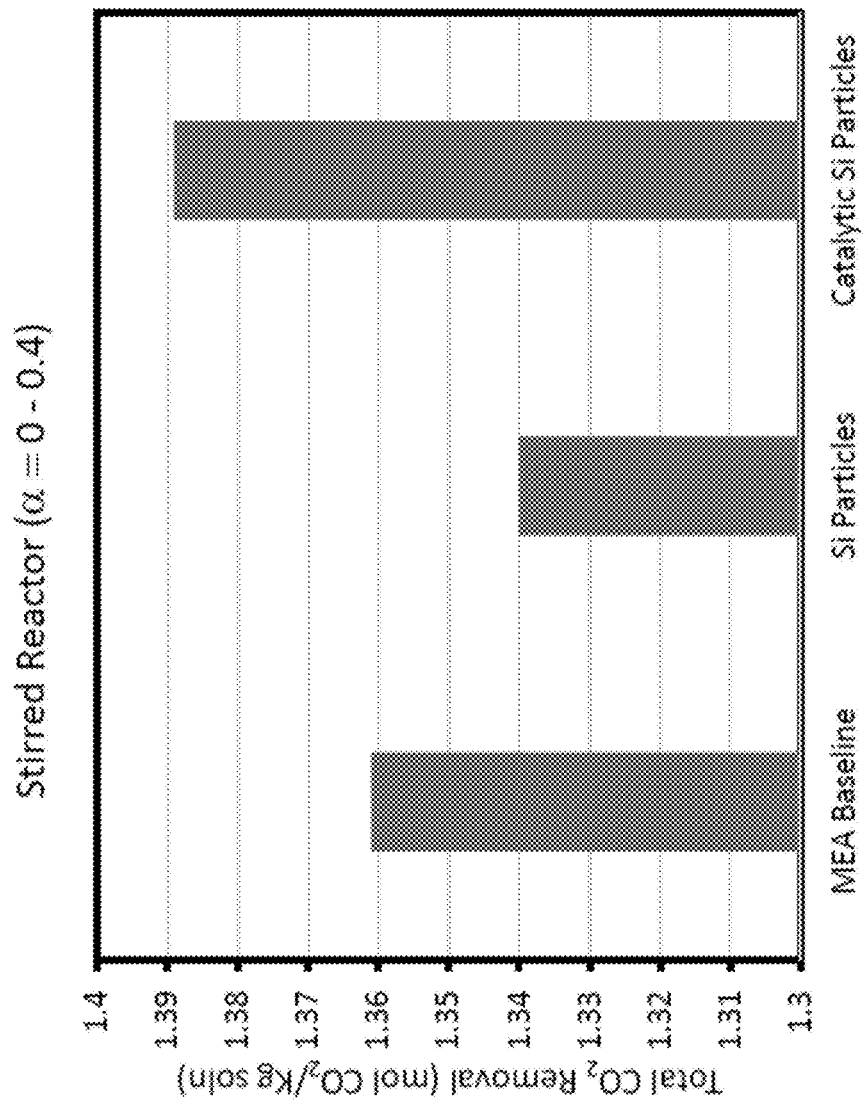
FIG. 6 shows a comparison of total $CO_2$ removal between Catalyst-appended hydrophobic Si catalytic-particles.
Figure 7:
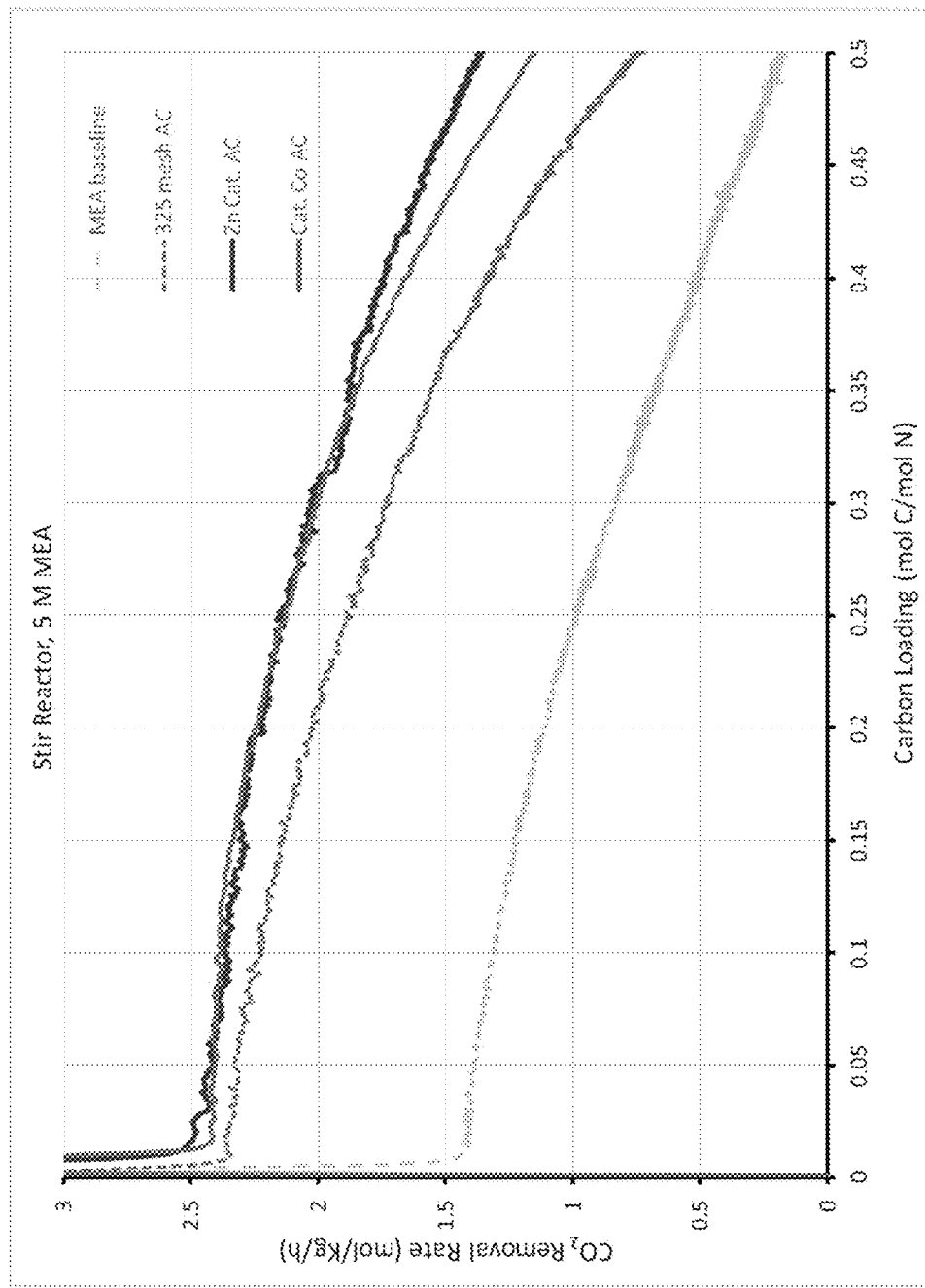
FIG. 7 shows a comparison of $CO_2$ absorption rate between baseline 30% MEA, activated carbon particles (325 mesh), and catalytic-particles (Zn Cat. And Cat Co).

The enhancement of small scale catalytic-particles on mass transfer enhancement was demonstrated using a stirred reactor at 150 rpm with a stable gas-liquid interface to simulate a liquid film on packing material. The experiments were conducted at room temperature and 14% $CO_2$ simulated flue gas for simplicity. The data presented in FIG. 5 shows the $CO_2$ removal rates upon the addition of hydrophobic silicon-based catalytic-particles to 30 wt % monoethanolamine (MEA) solutions. These data indicate that unfunctionalized Si particles may actually inhibit $CO_2$ absorption slightly, but upon addition of the catalyst to the particle surface there is an increase in absorption (~5%) over the entire experimental range. Identical experiments were performed with the addition of 1 wt % functionalized activated carbon particles (FIG. 7). These particles show a significant improvement in mass transfer compared to the baseline solvent as well as the unfunctionalized activated carbon particles.

Example 2

The use of micron-sized particles, modified with a surface-appended carbonic anhydrase mimic catalyst, for use as a dual purpose solvent-additive increases mass transfer of $CO_2$ into amine-based CCS solvents. The particle additive increases mass transfer by decreasing the diffusion resistance of $CO_2$ into the solvent, while the biomimetic surface functionalization enhances reaction kinetics by catalyzing $CO_2$ hydration and decreasing the reaction resistance.

Figure 10:
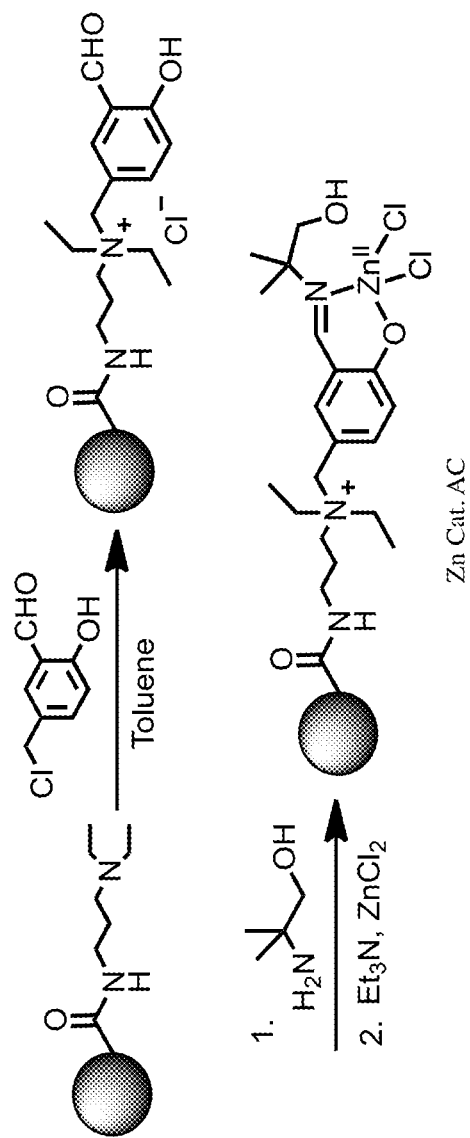
FIG. 10 shows a summary of synthesis of zinc catalysts surface-appended to activated carbon particles.

Zinc and Cobalt containing catalysts were synthesized. Synthesis of Zn Cat AC particles (FIG. 10) was achieved as follows: Tertiary Amine AC (10 g) was suspended in toluene, and chlorosalicyaldehyde (5.0 g, 30 mmol) was added. The mixture was stirred overnight before the solid was collected by filtration, washed with ethanol, acetone and ether. The resulting aldehyde particles were suspended in ethanol, and 2-methyl-2-amino propanol (AMP, 2.7 g, 30 mmol) was added and allowed to stir overnight. The solid was collected by filtration and washed with ethanol. The ligand-appended particles were re-suspended in ethanol before $ZnCl_2$ (4.1 g, 30 mmol) and trimethylamine ($Et_3N$, 3.04 g, 30 mmol) were added. After stirring overnight, the solid was collected by filtration, washed with ethanol, methanol, acetone and ether before air drying overnight. Synthesis of Co Cat AC was achieved using the same procedure as Zn Cat AC, with $CoCl_2$ for metalation.

Figure 8:
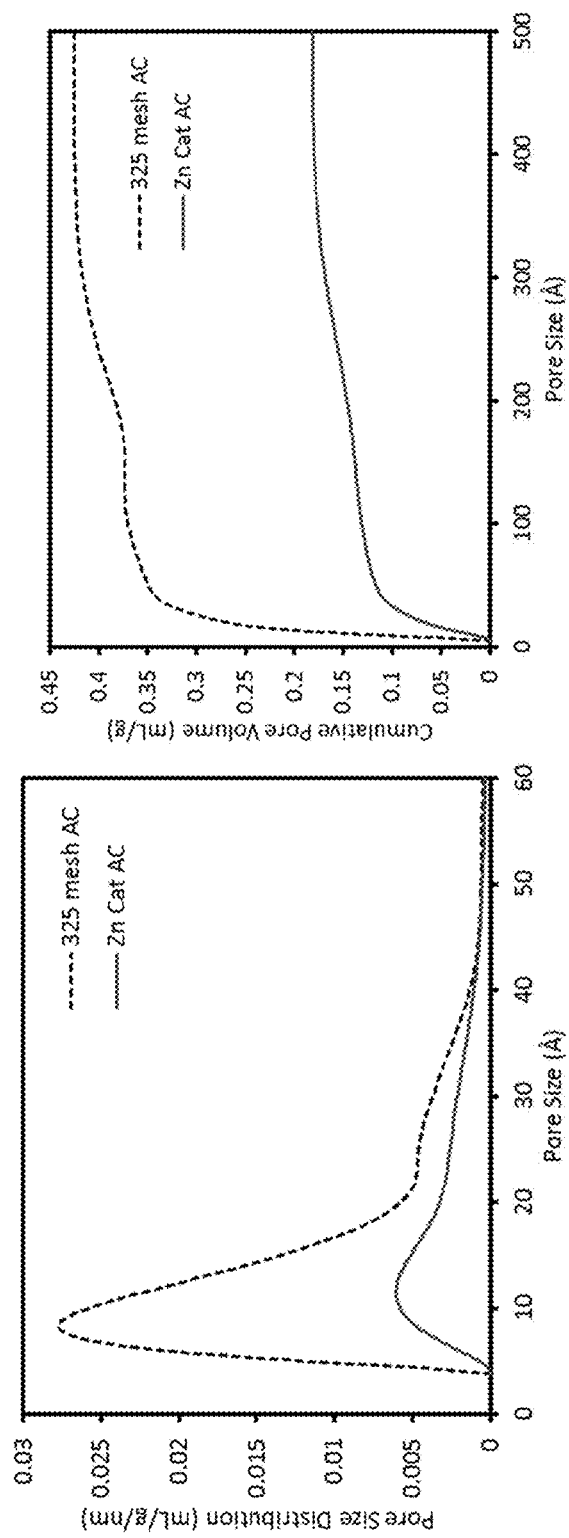
FIG. 8 shows BET data for Zn cat AC and commercially obtained 325 mesh AC.
Figure 9:
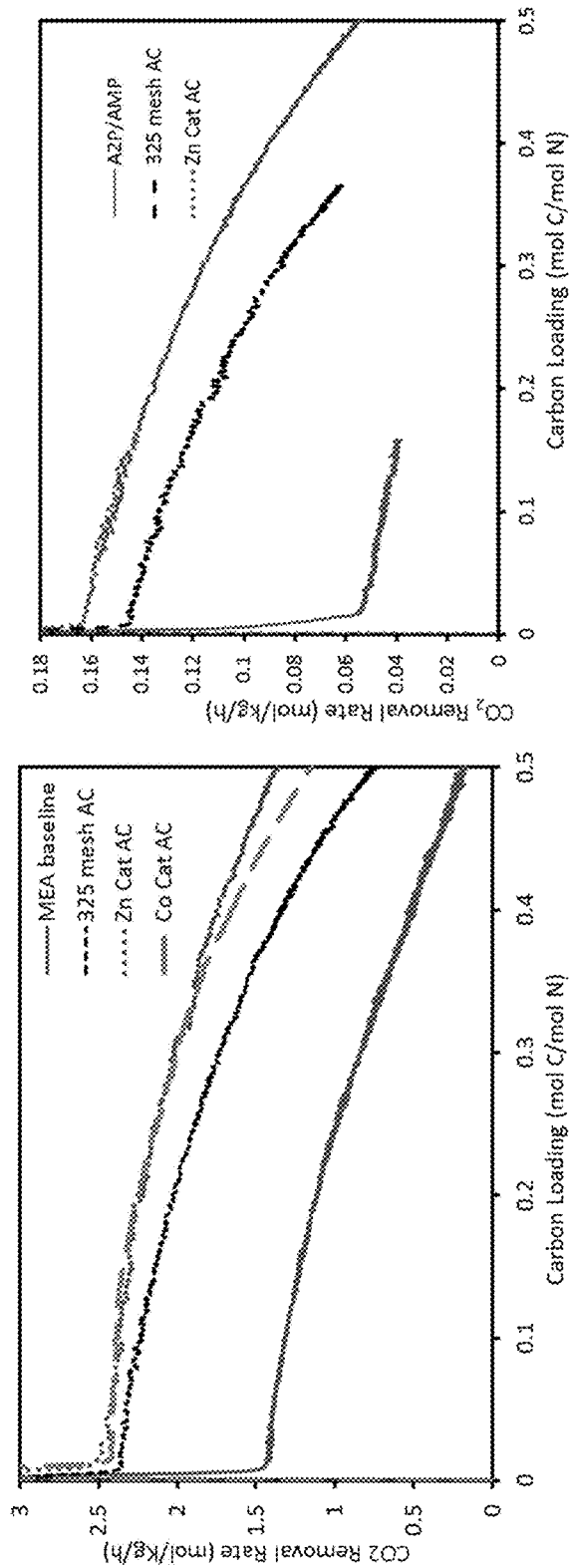
FIG. 9 shows stir reactor data, showing increase in overall $CO_2$ removal rate upon addition of 1 wt. % catalyst-functionalized particles.

Due to the similarity of the catalyst structures, the Zinc catalyst was characterized by BET, DLS, pKa & Bohem titrations for comparison to the commercially obtained 325 mesh starting material (see Table 1, FIG. 8). The mass transfer data was primarily collected in the stirred-reactor apparatus, with a flat gas-liquid interface, to simulate stable film formation on the packing material. The surface-modified particles were tested in order to improve mass transfer enhancement in both MEA and A2P/AMP (FIG. 9) and compared to the solvent baseline as well as the unfunctionalized 325 mesh carbon.

TABLE 1

Summary of surface properties of Zn Cat AC, as compared to commercial 325 mesh AC

| particle | α 0.3 rate (mol $CO_2$/kg/hr) | Z (d · nm) | Zeta (mV) | Surface pKa | Base Sites (mmol/g) | Acid Sites (mmol/g) |
|---|---|---|---|---|---|---|
| Unfunctionalized | 1.72 | 764.2 | −22.3 | 9.74 | 0.68 | 0.28 |
| Zn Cat | 2 | 719.2 | 16.9 | 6.48 | 0.034 | 0.87 |

The foregoing descriptions of various embodiments provide illustration of the inventive concepts. The descriptions are not intended to be exhaustive or to limit the disclosed invention to the precise form disclosed. Modifications or variations are also possible in light of the above teachings.

The embodiments described above were chosen to provide the best application to thereby enable one of ordinary skill in the art to utilize the inventions in various embodiments and with various modifications as are suited to the particular use contemplated. All such modifications and variations are within the scope of the invention. All publications, patents and patent applications referenced herein are to be each individually considered to be incorporated by reference in their entirety.

The invention claimed is:

1. A biphasic scrubbing solution comprising an amine solvent with catalyst-appended particles suspended therein, wherein the particles comprise a surface-appended carbon dioxide ($CO_2$) adsorption catalyst and a particle, wherein the catalyst is appended to a surface of a particle through a particle linker and a catalyst linker, the catalyst linker being selected from:

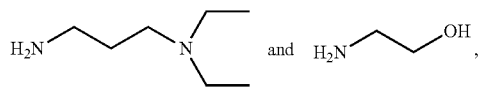

and
further wherein the particles have a width of less than about 500 microns.

2. The biphasic scrubbing solution of claim 1, wherein the catalyst linker comprises an electrophile or electrophile salt.

3. The biphasic scrubbing solution of claim 1, wherein the catalyst-appended particles are selected from the group consisting of:

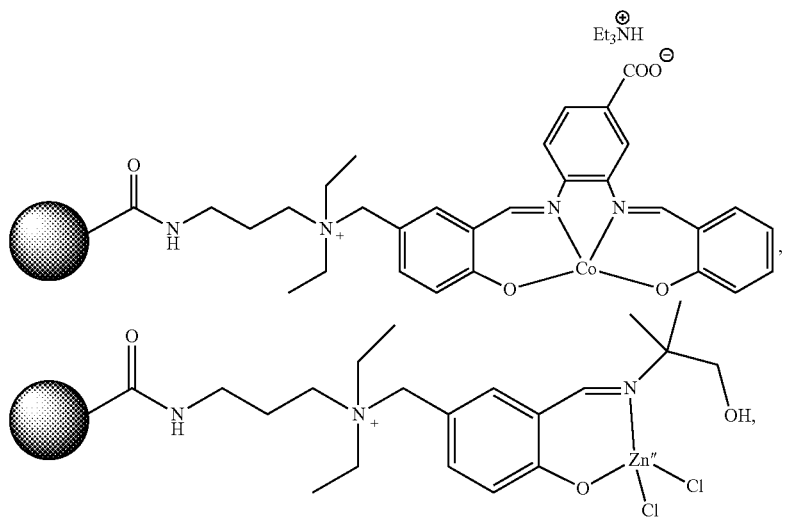

or mixtures thereof, and further wherein

represents the particle.

4. The biphasic scrubbing solution of claim 1, wherein the particles have a width of between about 0.1 and 500 microns.

5. The biphasic scrubbing solution of claim 1, wherein the particles have a width of less than 100 nanometers.

6. The biphasic scrubbing solution of claim 1, wherein the amine solvent is selected from the group consisting of monoethanolamine (MEA), 1-amino-2-propanol (1A2P), 3-amino-1-propanol, 2-amino-1-propanol, 2-amino-1-butanol, 1-amino-2-butanol, 3-amino-2-butanol, 2-(methylamino)ethanol (MAE), 2-(ethylamino)ethanol, morpholine, piperazine (PZ), 1-methylpiperazine (NMP), 2-methylpiperazine, hydroxypiperidine, 2-piperidineethanol, N-aminoethylpiperazine (AEP), aminopropylmorpholine, 4-aminopiperidine, 2-amino-2-methyl-1-propanol (AMP), diethanolamine (DEA), diisopropanolamine (DIPA), glycine, alanine, β-alanine, sarcosine, ethylene diamine (EDA), 1,3-propanediamine, 1,4-butanediamine, 1,5-pentanediamine, 1,6-hexanediamine, methyldiethanolamine (MDEA), triethanolamine (TEA), dimethylethanolamine (DMEA), N,N,N',N'-tetramethyl-1,8-naphthalenediamine, diethylmonoethanolamine, dipropylmonoethanolamine, 1,4-dimethylpiperazine, N N,N',N'-tetramethyl-1,6-hexanediamine, N,N,N',N'-tetrakis(2-hydroxyethyl)ethylenediamine, N,N,N',N',N''-pentamethyldiethylenetriamine, N,N,N',N'-tetramethylethylenediamine, N,N,N',N'-tetramethylpropane-1,3-diamine, N,N,N',N'-tetramethylbutane-1,4-diamine, N,N,N',N'-tetramethyl-1,5-pentanediamine, alkali carbonate, and mixtures thereof.

7. The biphasic scrubbing solution of claim 1, wherein the particles comprise between about 0.5 to 2.5 percent by weight of the biphasic scrubbing solution.

8. The biphasic scrubbing solution of claim 1, wherein the amine solvent comprises an amine dissolved in water, wherein the amine comprises between about 15 to about 50 weight percent of the amine solvent.

9. The biphasic scrubbing solution of claim 1, wherein the amine solvent has a viscosity of between about 3 to about 10 cP.

10. The biphasic scrubbing solution of claim 1, wherein the particles are hydrophobic.

11. The biphasic scrubbing solution of claim 1, wherein the particles comprise activated carbon particles.

12. The biphasic scrubbing solution of claim 1, wherein the particles are functionalized to increase positive zeta potential.

13. The biphasic scrubbing solution of claim 12, wherein the particles are functionalized by oxidation.

14. The biphasic scrubbing solution of claim 12, wherein the particles are functionalized by surface-appending with a functional group selected from the group consisting of an alcohol, a primary amine, a tertiary amine, and an amino silane.

15. The biphasic scrubbing solution of claim 14, wherein the catalyst of the catalyst-appended particles comprises a carbonic anhydrase mimic catalyst of a bidentate transition-metal ligand complex.

16. The biphasic scrubbing solution of claim 15, wherein the carbonic anhydrase mimic catalyst comprises a structure of:

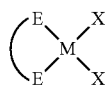

where:
(a) M is any group VII B through XII B element;
(b) x=neutral sigma donor or monovalent anion; and
(C)

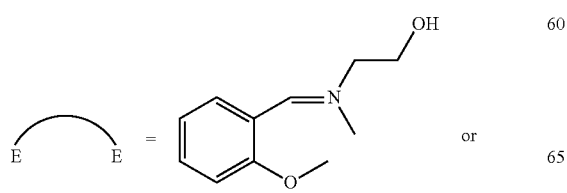

or

-continued

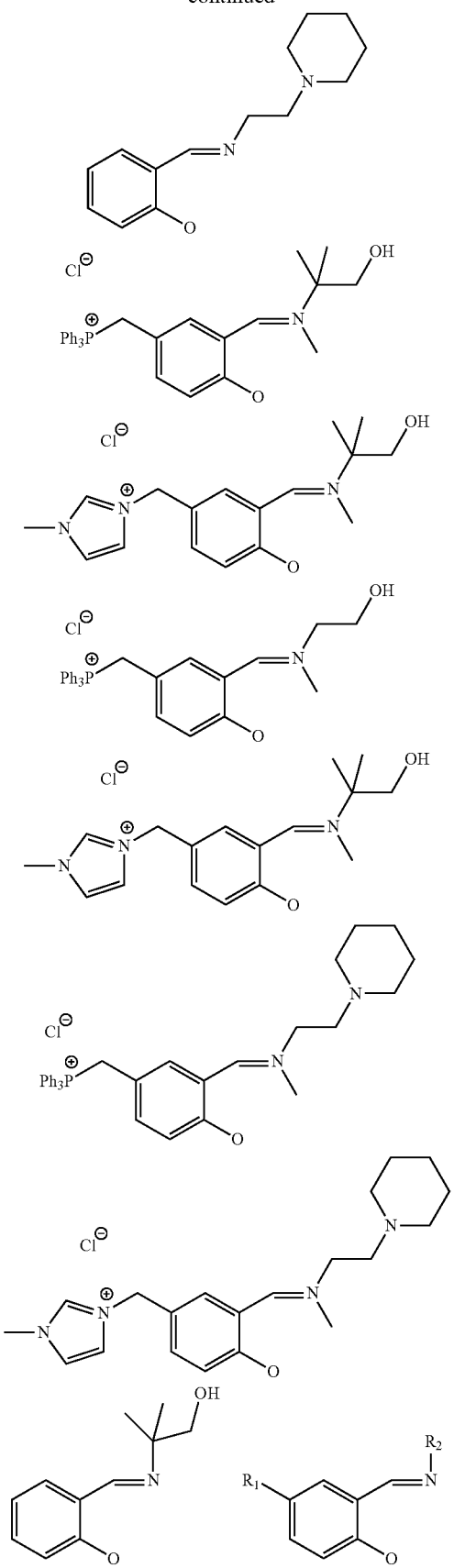

$R_1$=H, any alkyl, RCOOH (R=alkyl ranging from 0-10 carbons); OligoPEG, phosphate, ROH (R=alkyl ranging from 0-5 carbons), —[OCH$_2$CH$_2$] repeats; OH; SO$_3$; NO$_2$; amine, amide, carbonyl Cl, Br, I, F, BH$_3$, [CH$_2$Q]+[A]-; and

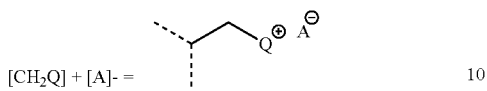

[CH$_2$Q] + [A]- = where A=monovalent anion: Cl, Br, I, F, PF$_6$, BF$_4$, acetate, trifluoroacetate, ClO$_4$, NO$_3$, and Q=monovalent cation: P(R)$_3$, R=alkyl, cyclic alkyl, Aryl, O-alkyl, O-Aryl; and N(R)$_3$, R=alkyl, cyclic alkyl, N-heterocyclic ring, imidazole; and $R_2$=CE; where C=any alkyl, cyclic alkyl, aryl, and E=OH, NH$_2$, N(R)$_3$, R=alkyl, cyclic alkyl, N-heterocyclic ring, imidazole, morpholine.

17. The biphasic scrubbing solution of claim 15, wherein the carbonic anhydrase mimic catalyst comprises a structure selected from the group consisting of:

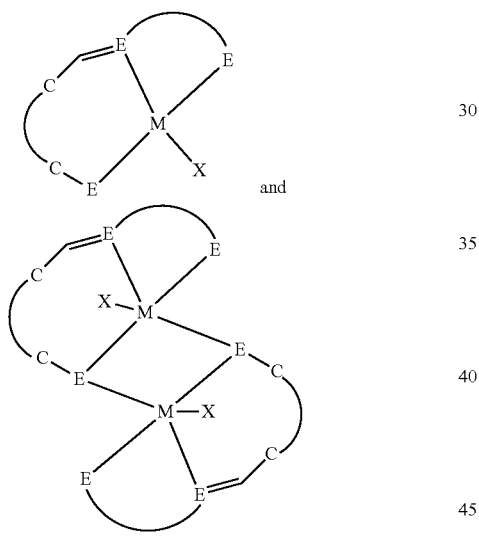

and where:
(a) M is any group VII B through XII B element;
(b) x=neutral sigma donor or monovalent anion;
(c)

where $R_1$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO; NO$_2$; amine, amide, carbonyl, Cl, Br, I, F, BH$_3$, [CH$_2$Q]$^+$[A]$^-$ $R_2$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_3$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_4$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_5$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_6$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_7$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$ $R_8$=H, any alkyl, RCOOH (R=alkyl ranging from 0-10 carbons); OligoPEG, phosphate, ROH (R=alkyl ranging from 0-5 carbons), —[OCH$_2$CH$_2$]— repeats; OH; SO$_3$; NO$_2$; amine, amide, carbonyl Cl, Br, I, F, BH$_3$, [CH$_2$Q]$^+$[A]$^-$; and

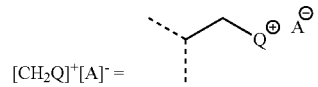

[CH$_2$Q]$^+$[A]$^-$ = where A=monovalent anion: Cl, Br, I, F, PF$_6$, BF$_4$, acetate, trifluoroacetate, ClO$_4$, NO$_3$, and Q=monovalent cation: P(R)$_3$, R=alkyl, cyclic alkyl, Aryl, O-alkyl, O-Aryl;

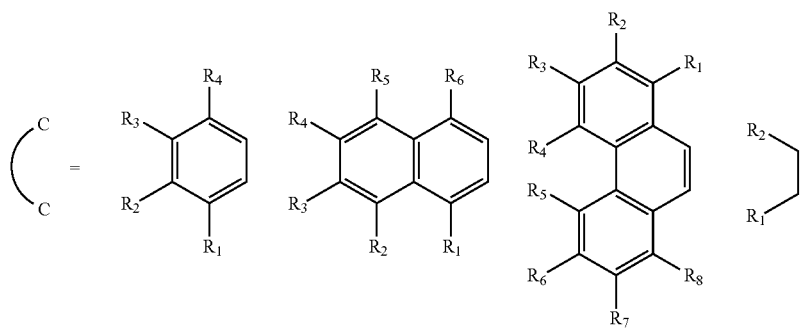

N(R)₃, R=alkyl, cyclic alkyl, N-heterocyclic ring, imidazole; and (d)

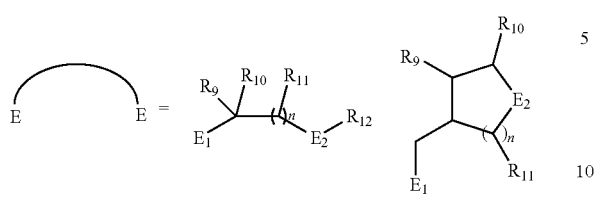

where
E₁=N, P, S, B;
E₂=N, P, S, O, B; n=1-10; and wherein E in C-E-M is O.

18. The biphasic scrubbing solution of claim 15, wherein the carbonic anhydrase mimic catalyst comprises a bidentate transition-metal ligand complex selected from the group consisting of:

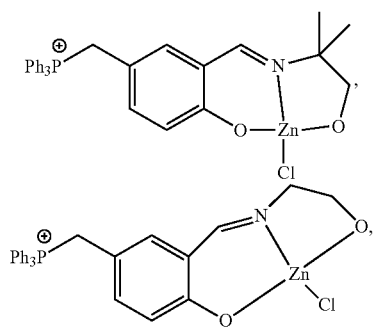

-continued

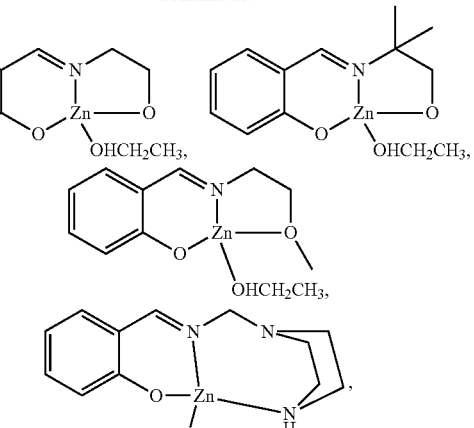

19. A method for increasing carbon capture from a gas comprising contacting the gas with the biphasic scrubbing solution of claim 1.

20. A biphasic scrubbing solution comprising an amine solvent with catalyst-appended particles suspended therein, wherein the catalyst-appended particles are selected from the group consisting of:

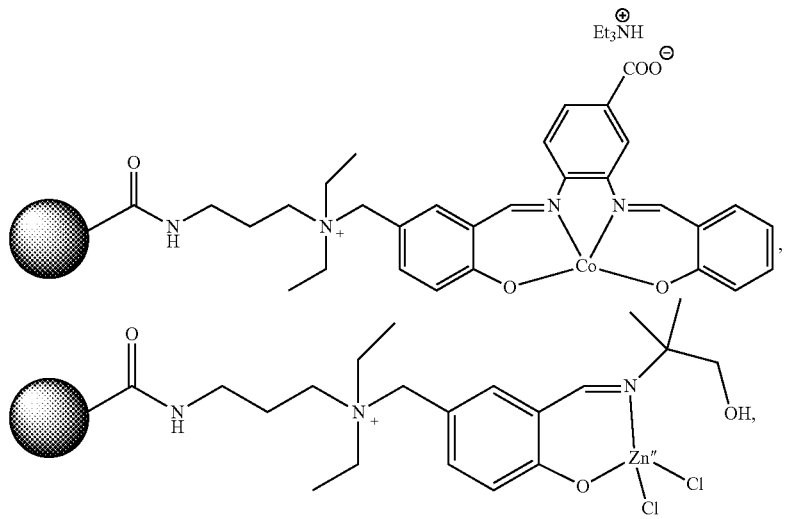

or mixtures thereof, and further wherein

represents the particle.

* * * * *